United States Patent [19]
Guarino

[11] Patent Number: 5,863,578
[45] Date of Patent: *Jan. 26, 1999

[54] MICROWAVEABLE VACUUM PACKED SEAFOOD PACKAGE AND PROCESS

[75] Inventor: Nicholas A. Guarino, Roatan, Honduras

[73] Assignee: Carnival Brand Seafood Company, Fort Lauderdale, Fla.

[*] Notice: The term of this patent shall not extend beyond the expiration date of Pat. No. 5,817,353.

[21] Appl. No.: 746,031

[22] Filed: Nov. 6, 1996

Related U.S. Application Data

[63] Continuation-in-part of Ser. No. 637,610, Apr. 25, 1996.

[51] Int. Cl.⁶ .................................................. B65B 29/08
[52] U.S. Cl. ........................ 426/113; 426/90; 426/92; 426/107; 426/124; 426/129; 426/234; 426/393; 426/396; 426/412; 53/434; 53/449; 206/778
[58] Field of Search ........................................ 426/107, 114, 426/234, 129, 412, 396, 393, 113, 124, 92, 90; 53/434, 449, 444, 445; 206/778, 784

[56] References Cited

U.S. PATENT DOCUMENTS

| | | | |
|---|---|---|---|
| 2,674,536 | 4/1954 | Fisher | 426/114 |
| 2,776,215 | 1/1957 | Thomas | 426/396 |
| 2,776,216 | 1/1957 | Thomas | 426/396 |
| 2,850,391 | 9/1958 | Gunsberg | 426/113 |
| 2,920,968 | 1/1960 | Grandy | 426/129 |
| 3,012,894 | 12/1961 | Nagel | 426/113 |
| 3,152,915 | 10/1964 | Cover et al. | 426/393 |
| 3,271,169 | 9/1966 | Baker et al. | 426/114 |
| 3,587,839 | 6/1971 | Vonbrecht | 426/129 |
| 3,692,545 | 9/1972 | Moore | 426/129 |
| 3,780,196 | 12/1973 | Domecki | 426/393 |
| 3,864,503 | 2/1975 | Steenolsen | 426/412 |
| 3,895,120 | 7/1975 | Backus | 426/129 |
| 3,912,823 | 10/1975 | Kane | 426/129 |
| 4,081,646 | 3/1978 | Goltsos | 426/107 |
| 4,133,896 | 1/1979 | Standing et al. | 426/113 |
| 4,141,487 | 2/1979 | Faust et al. | 426/113 |
| 4,230,729 | 10/1980 | Hoelzel | 426/129 |
| 4,425,368 | 1/1984 | Watkins . | |
| 4,456,164 | 6/1984 | Foster et al. . | |
| 4,529,089 | 7/1985 | Gasbarra et al. | 426/113 |
| 4,571,337 | 2/1986 | Cage et al. . | |
| 4,798,728 | 1/1989 | Sugisawa et al. | 426/129 |
| 4,801,077 | 1/1989 | Sweat et al. | 229/125.19 |
| 4,835,942 | 6/1989 | Skrmetta | 426/107 |
| 4,839,180 | 6/1989 | Standerwick et al. . | |
| 4,857,342 | 8/1989 | Kappes | 426/113 |
| 4,862,791 | 9/1989 | Baughey | 426/113 |
| 4,873,101 | 10/1989 | Larson et al. . | |

(List continued on next page.)

FOREIGN PATENT DOCUMENTS

| | | | |
|---|---|---|---|
| 479968 | 1/1952 | Canada | 426/107 |
| 374071 | 6/1990 | European Pat. Off. | 426/129 |
| 1258357 | 2/1960 | France | 426/129 |
| 2483190 | 12/1981 | France | 426/129 |
| 5898058 | 6/1983 | Japan | 426/129 |
| 60-234539 | 5/1984 | Japan | 426/129 |
| 59106253 | 6/1984 | Japan | 426/129 |
| 62-244340 | 10/1987 | Japan | 426/113 |
| 63-254964 | 10/1988 | Japan | 426/113 |
| 63-283558 | 11/1988 | Japan | 426/393 |
| 2-60579 | 3/1990 | Japan | 426/234 |
| 6-78720 | 3/1994 | Japan | 426/412 |
| 2199235 | 7/1968 | United Kingdom | 426/113 |
| 2121752 | 1/1984 | United Kingdom | 426/412 |

OTHER PUBLICATIONS

Modern Packaging 1/55 pp. 79,160,162 426/129.

*Primary Examiner*—Steven Weinstein
*Attorney, Agent, or Firm*—Quarles and Brady

[57] ABSTRACT

Packaging for seafood that may have been coated in sauce or marinated, including the optional use of pallet structure for positioning the product within the packaging to be vacuum sealed and flash frozen before being subsequently microwaved without rupture of the packaging until after microwaving.

35 Claims, 5 Drawing Sheets

U.S. PATENT DOCUMENTS

| | | | |
|---|---|---|---|
| 4,898,743 | 2/1990 | Ross et al. | 426/113 |
| 4,933,526 | 6/1990 | Fisher et al. . | |
| 4,948,605 | 8/1990 | Lambert, Jr. . | |
| 4,954,356 | 9/1990 | Kappes . | |
| 4,964,507 | 10/1990 | Chen | 426/129 |
| 5,044,777 | 9/1991 | Watkins et al. . | |
| 5,085,879 | 2/1992 | Elbar | 426/129 |
| 5,164,211 | 11/1992 | Comer | 426/129 |
| 5,247,149 | 9/1993 | Peleg . | |
| 5,256,434 | 10/1993 | Conway | 426/129 |
| 5,345,069 | 9/1994 | Grindrod . | |
| 5,377,855 | 1/1995 | Cook et al. | 426/129 |
| 5,431,938 | 7/1995 | Kou . | |
| 5,457,939 | 10/1995 | Bardou . | |
| 5,473,866 | 12/1995 | Maglecic et al. . | |

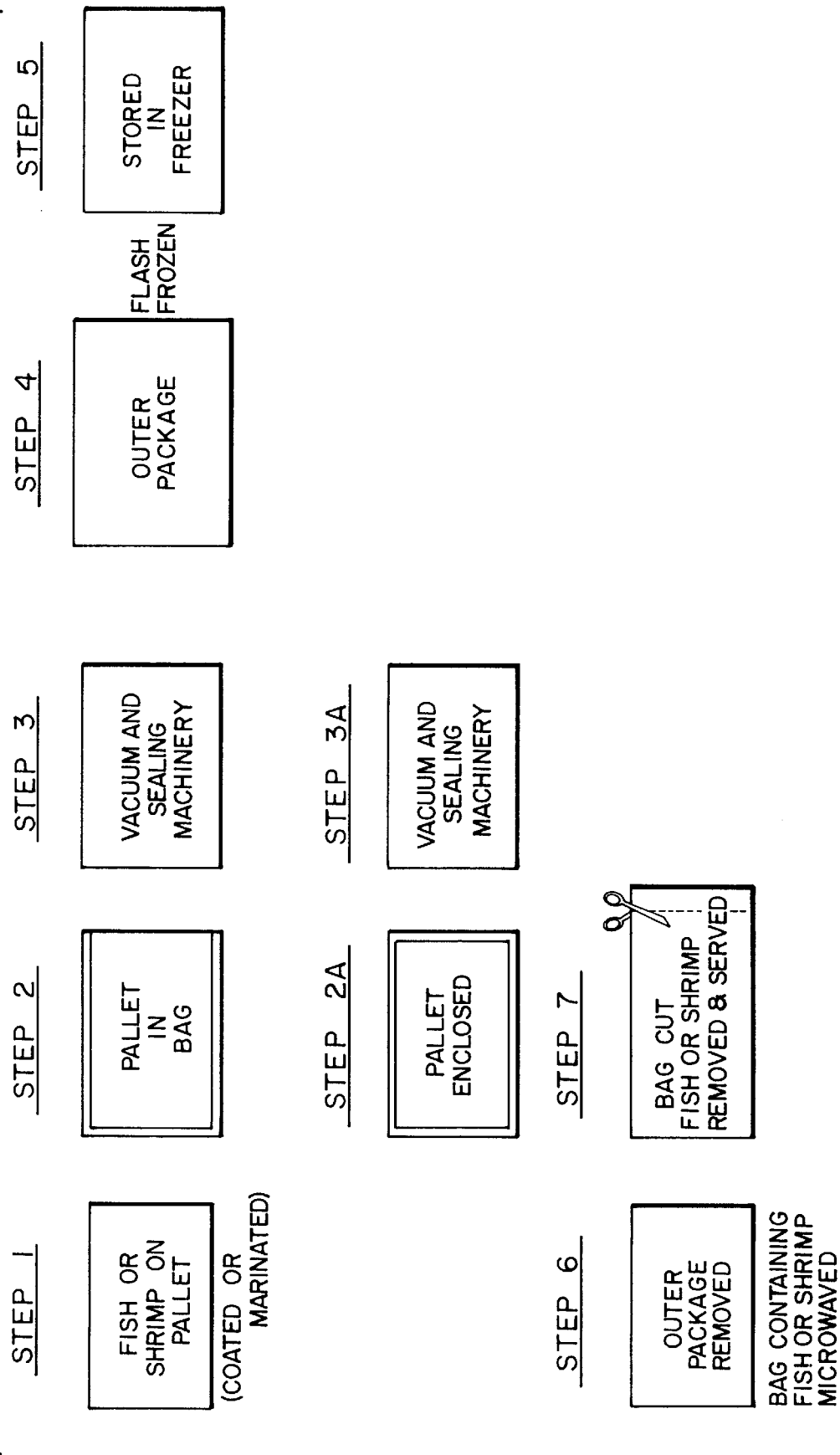

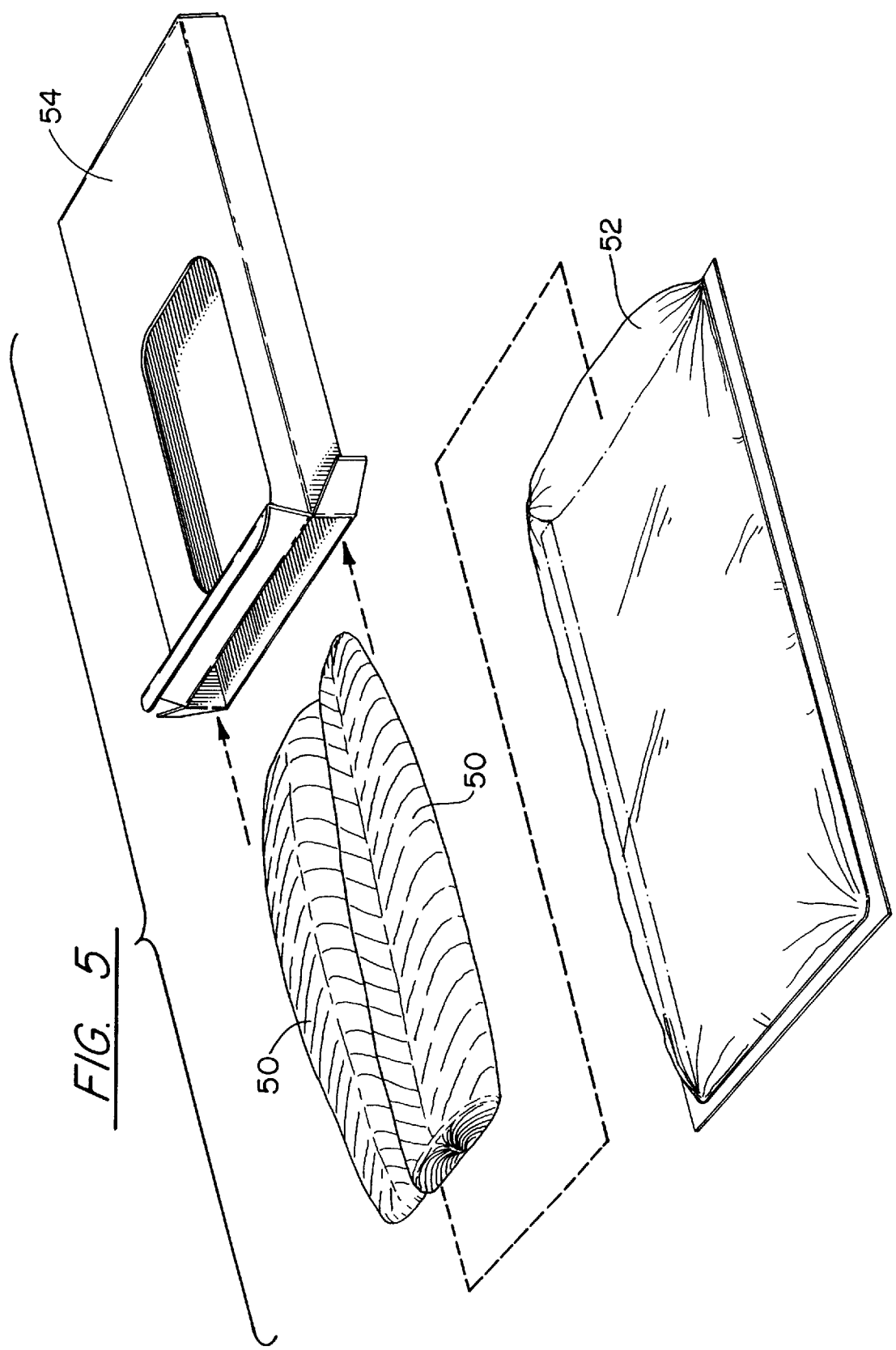

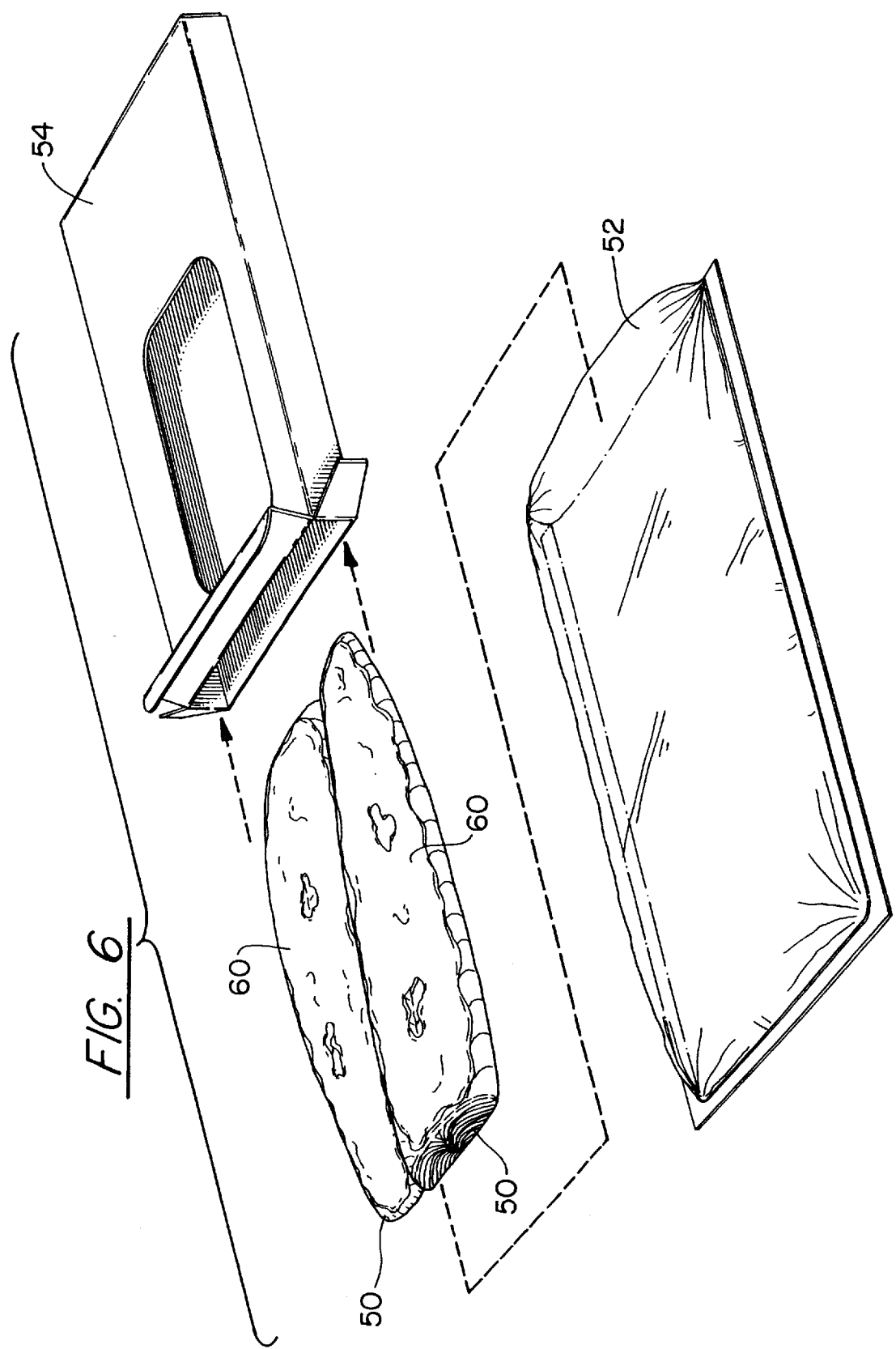

MICROWAVEABLE VACUUM PACKED SEAFOOD PACKAGE AND PROCESS

CROSS-REFERENCE TO RELATED APPLICATION

This application is a continuation-in-part of U.S. Ser. No. 08/637,610, filed Apr. 25, 1996.

BACKGROUND OF THE INVENTION

Heretofore, packaging of seafood in vacuum packed containers, which could subsequently be microwaved, has not been extended to include the addition of ingredients such as sauces and the like whereby products such as shrimp scampi and lemon pepper snapper can be achieved.

With vacuum packaging of any seafood product, there has been significant concern with the potential of mold, yeast, bacteria, especially botulism. Prior to the development at hand, seafood companies have stayed away from attempting to produce a product comparable to that disclosed within. Processes have been tried before to eliminate the threat of botulism. Examples of such processes are nitrogen flushing and radiation. Notwithstanding these attempts, success has not previously been obtainable, primarily because of problems associated with the integrity of the packaging leading to health issues such as botulism.

While vacuum sealing has been successfully used for packaging shellfish without the shells and other fish in bulk, flat packing seafood marinated in sauces in vacuum sealed containers suitable for retail has not been successfully done, explaining the absence of the use of such packaging in the marketplace. Further, with prior packaging, the packaged product has not been suitable for microwaving the product directly in its shipping and sales package. While vacuum packaging has been used for a variety of vegetables and meats, this usage has not extended successfully to retail packaging of seafood.

An example of vacuum packaging technique of food stuffs generally is found in U.S. Pat. No. 5,473,866. A seafood vacuum pack system is disclosed in U.S. Pat. No. 4,835,942 but with respect to packing technique, this patent teaches away from the subject invention in that shrimp are intentionally stacked one above the other at the periphery of the packages. Likewise, U.S. Pat. No. 4,964,507 teaches the use of a "protruding-up curved section" of a case which is also contrary to the packing technique of the subject invention. Neither of these latter patents disclose any use of prepared delicacies such as shrimp scampi and fish in lemon pepper or honey mustard sauce which are prepared, and subsequently vacuum packed in a microwaveable container. None of the prior art patents teach microwaving such foodstuffs in a sealed package without any venting during the microwaving step.

SUMMARY OF THE INVENTION

Accordingly, the subject invention is directed to packaging which permits the vacuum packaging of seafood typically marinated or otherwise adorned in sauce to enable the packaged product to be presented to consumers in attractive packaging while maintaining the integrity of the vacuum packaging to provide a packaged product which can be successfully microwaved without removing the product. For aesthetic, packaging, and microwaving reasons, the shrimp or other fish are packed in a carefully presented orientation which enables the product to be successfully packed in the first instance, and subsequently microwaved without removal of the product until completion of the microwaving at which time the package is for the first time ruptured and the contents removed. While some prior patents disclose various designs which promote venting of the package during microwaving, the subject package maintains its integrity until the microwaving is completed, at which time the package is ruptured for the first time. The seafood need not be marinated and can be, of course, packaged without sauce. On the other hand, sauces such as sweet and sour, lemon pepper, and honey mustard may be added to the seafood.

It is therefore an object of the subject invention to provide a vacuum packaging process and the packaging to enable shellfish and other fish, which may be marinated prior to packaging, to be safely packaged, and subsequently microwaved in the same package.

It is a further object of the subject invention to provide a process and packaging to present shellfish and other fish to the consumer in retail packaging heretofore unknown to the consumer, which packaging then forms a container for microwaving the product, which container remains sealed until the microwave process is completed.

It is a related object to provide a process by which seafood is flat packed, flash frozen, and distributed, to be subsequently microwaved in the same container by the purchaser.

It is still a further object of the subject invention to provide seafood in desirable packaging to promote favorable product appearance and to facilitate utilitarian objectives, including the ability to microwave the seafood within the same packaging.

It is one more object of the subject invention to develop a packaging process whereby concerns of spoilage, botulism, mold, yeast, and bacteria are effectively minimized and to maintain the product in ready condition for microwaving at a moment's notice at any time.

It is still another object of the subject invention to provide a process and packaging of seafood in a cost efficient manner wherein the package itself becomes a "steam" container for microwaving.

It is one more object of the subject invention to provide a process and packaging to permit the flat packaging of prepared seafood which can be seen by the consumer upon purchase.

In compliance with the above objects, seafood is vacuum packed as follows. If the product to be packed is peeled and deveined shrimp, the shrimp are spread out on a pallet to prevent bunching which might cause undue pressure on the packaging once sealed. The shrimp may be enveloped in a sauce such as that used to prepare shrimp scampi. Seafood such as snapper or swordfish may be placed in a lemon pepper, honey mustard or other sauce prior to packing.

In the preferred embodiment, a pallet of very specific design is used. One side of the pallet is matted or rough so as to help secure the shrimp or fish in desired orientation. The other side of the pallet is smooth so as to facilitate the handling and in particular the packaging, as the pallet can be easily slid into a bag or otherwise positioned prior to the step of vacuum sealing the product. The matted or rough side of the pallet may also be coated with a reflective material which promotes microwaving but which is not so reflective that it becomes detrimental to the microwaving process.

The pallet also may have raised sides which help to ensure that the shrimp or fish will remain flat and well-orientated during the packaging process. The sides also help, as the vacuum sealing takes place so the shrimp or fish along the sides are insulated from direct contact from the sides of the packaging to prevent puncturing. The sides can be a critical stressed area as the covering bag fits fairly tightly around the shrimp or fish. It is necessary that the bag fit tightly to help hold the shrimp or fish in flat, non-bunched, orientation so they can be successfully microwaved. In at least one embodiment, however, a pallet is not used and the product is introduced directly into a bag, which is subsequently vacuum sealed.

Once the shrimp or fish are placed on the pallet and the pallet is positioned within the bag of plastic film, the vacuum sealing can take place with somewhat standard and well-known equipment. Typically a vacuum means will draw a vacuum within the filled bag and a seal jaw assembly will heat seal the bag once the air is evacuated. The vacuum-heat sealing equipment is not part of the subject invention.

The sealed bag with shrimp or fish, marinated if desired, can then be placed in an outer package, preferably of milk-carton type cardboard, which will stabilize the bag within and help to hold the seafood in appropriate non-bunched orientation. The outer package may be waxed on both sides so water will not penetrate. The outer package is designed for retail acceptance and will likely include a window so that the shrimp or fish may be examined within the inner package. This outer package will be removed when microwaving takes place.

The shrimp or fish may also be marketed in the sealed bag without the outer package. Sales information can be placed on the bottom of the pallet, which will be seen through the bag material which will be transparent, or on the bag itself.

Regardless of the use or not of the outer package during the packing process, the shrimp or fish may be covered with sauce, as desired, by soaking, coating or otherwise and, are placed on the pallet in a non-frozen state. Upon being packed as disclosed herein, the seafood as coated or marinated is immediately flash frozen, using any of several commercial techniques, such as, but not limited to, blast freezing, contact freezing or tunnel freezing, and marketed in such frozen state.

It is contemplated that the packaged seafood remain in a frozen state through distribution, retail, etc. until approximate time of consumption. The packaged seafood can then be placed in a microwave unit in its frozen state. The bag or package has been designed to retain its integrity through the microwaving process and will not rupture during the process. As the frozen product is microwaved, the resulting locked-in moisture will provide the basis for steaming the seafood in its sauce (as provided) within the bag or package to then be removed by rupturing the bag and served for consumption.

If sauce is not used, the seafood will typically be packaged in a relatively wet state. This facilitates the "steaming" that occurs during microwaving. If fish is the product, fillets will be the preferred product, with controlled thickness to enable successful microwaving. Upon completion of microwaving, the fillets are ready to serve.

DETAILED DESCRIPTION OF THE DRAWINGS

FIG. 4 shows the steps of the process by which the seafood is coated in sauce, vacuum packaged, frozen, stored, subsequently microwaved, unpackaged and served according to the steps of the subject invention.

FIG. 5 is a sequential perspective view similar to FIG. 1, only fish fillets are packaged without the use of a pallet; and FIG. 6 is similar to FIG. 5, only the fish fillets have been marinated or otherwise coated with sauce before insertion into the inner packaging.

DETAILED SPECIFICATION

Figure 1:
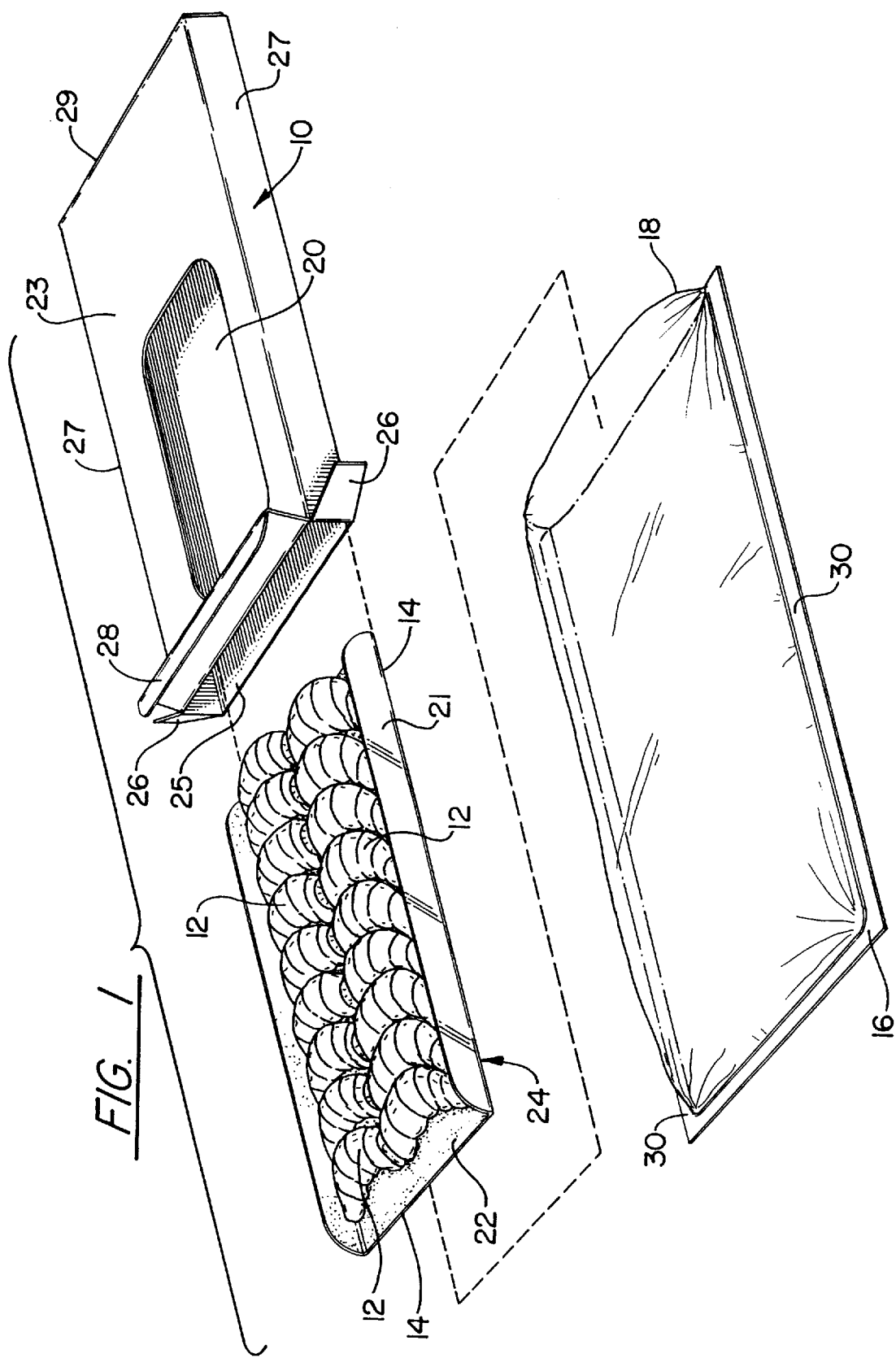
FIG. 1 is a sequential perspective view showing seafood, in this case shelled shrimp coated in sauce on a pallet, the inner packaging to cover and seal the shrimp and the outer container to receive the packaged shrimp.

Seafood such as peeled and deveined shrimp are packed plain, coated or otherwise prepared in sauce in the package 10 as shown in FIG. 1. Fish, preferably fillets, can be the product of choice instead. The seafood will be placed on pallet 14 which will then be inserted into the transparent envelope of packaging 16 as shown and slid within, at which time vacuum will be applied and the envelope or bag-like container 16 will be sealed by the processing equipment. More specifically, a vacuum is created as vacuum means (not shown) causes the air to be sucked from within prior to the sealing of the end 18 of bag 16 as is standard in vacuum packaging of food stuffs. The bag 16 can be formed around the seafood as well; i.e., by laying the seafood on a lower sheet of packaging, covering with the top sheet and sealing the edges as is commercially known.

The envelope or bag 16 containing the product (shrimp 12) is now ready to be placed within the outer package or container 10, having window or opening 20 for viewing of the shrimp 12.

The shrimp 12 can be first prepared in a variety of different ways before the pallet 14 is placed into the packaging 16. For example, the shrimp 12 may be peeled, deveined and immersed in a recipe of olive oil, butter, garlic, ground pepper, and other spices in preparation of a shrimp scampi dish. If fish is the product, they can be coated or marinated in sweet and sour, lemon pepper, or honey mustard or other sauce.

The shrimp 12 may be aligned as shown in FIG. 1 or may be randomly presented in sauce. The pallet 14 may be constructed of plastic with some rigidity that enables the shrimp 12 to be positioned thereon and inserted into the envelope 16. If the envelope 16 is punctured, or ruptured, storage problems can result and the ability to subsequently microwave the product in its bag 16 will be compromised as well. The bag 16 may be of 2-ply construction comprised of polypropylene and nylon, with the polypropylene enabling it to tolerate temperature extremes and the nylon contributing to its strength. Equivalent material may also be used.

Also, as shown in FIG. 1, the pallet 14 may have side structure 21 which will help to keep the desired orientation of the shrimp 12 or fish. In particular, as the package, envelope nor bag 16 is sealed and then inserted into non-sealed outer package 10, stress points might exist along its sides and the pallet side structure 21 helps to protect the bag seal by acting as a buffer between the shrimp 12 and the sides of bag 16. The bag seal across the top may be very tight to the shrimp 12, to hold them in desired orientation which may assist the microwaving step.

Upon further examination of FIG. 1, the pallet 14 will be seen to have two very different surfaces. The top surface 22 on to which the shrimp 12 will be positioned, is matted or roughened to also prevent the shrimp 12 from sliding and penetrating the plastic film structure of envelope 16.

The top surface 22 may also have a reflective coating to facilitate microwaving once the envelope 16 is inserted into a microwave unit prior to consumption. The reflective coating, thanks to the roughness of the surface, will not be a detriment to microwave as the waves will not be directed back to the microwave source due to the roughness which creates something less than direct reflection. The reflective coating can be a foil which may be gold in color.

The bottom surface 24 is smooth, as best seen on the sides 21 which are turned up at an approximate 90 degree angle. The smoothness facilitates the handling of the pallet 14 and, in particular, the sliding of the pallet 14 within envelope 16 prior to the vacuum sealing of the envelope by sealing edge or end 18.

As can further be seen in FIG. 1, once the shrimp 12, on pallet 14, are placed within bag 16 and sealed, the bag 16 is placed within outer package or container 10, which is preferably made of milk-carton type cardboard with both sides waxed or substitute. The waterproof container or cardboard box 10 basically has a top 23 and bottom 25 portion, sides 27, and ends 29. The opening 20 in top portion 23 is cut in such a way to enable the product within to be viewed.

Once the bag or package 16 is placed within outer package or container 10, the container 10 is closed by tucking in side flaps 26 and end flap 28.

Figure 2:
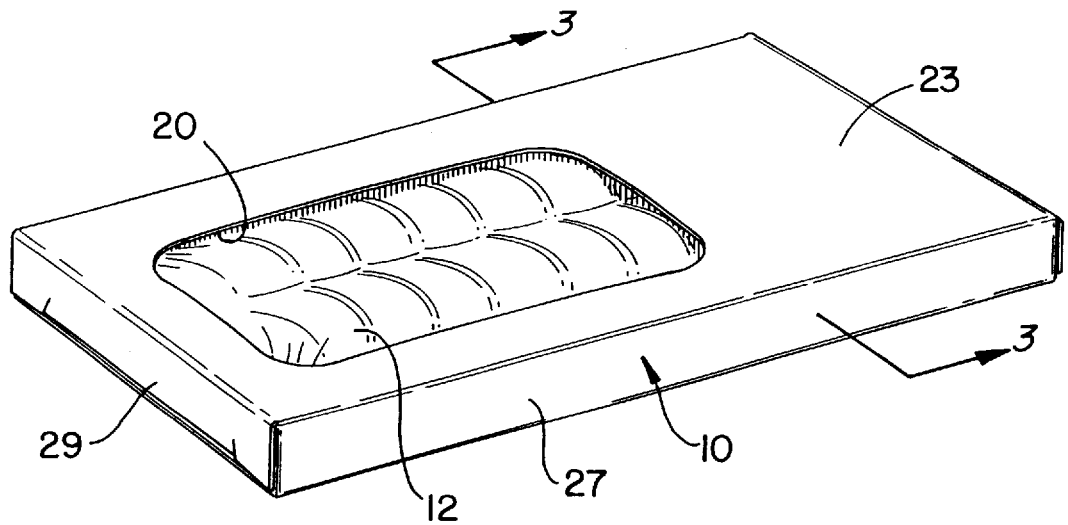
FIG. 2 is a perspective view showing packaged fish coated in sauce following the teachings of the subject invention.

As can be seen in FIG. 2, packaged fish 13 as may be first coated in sauce may be viewed through opening 20 as the packed frozen fish 13 is presented for sale in commercial establishments such as grocery chains. The container 10 is essentially the same as described in FIG. 1, only fish 13 are the packaged product as opposed to shrimp 12. The packages 10 will typically be stacked within freezer compartments to present an attractive product for the purchasers.

It will be appreciated that a wide variety of fish 13 may be packaged as discussed herein. Tuna steaks, snapper filets, sword fish steaks and various other fish may be packaged and marketed as described. The fish products may be either packaged plain or they can be immersed or marinated in sauce to provide delicacies such as lemon pepper snapper. The fish may be soaked in a sauce for hours before being packaged.

Typically, the fish pieces or cut filets will be approximately ¾ of an inch to one inch thick which is ideal for microwaving the fish within the bag 16 as discussed herein.

Figure 3:
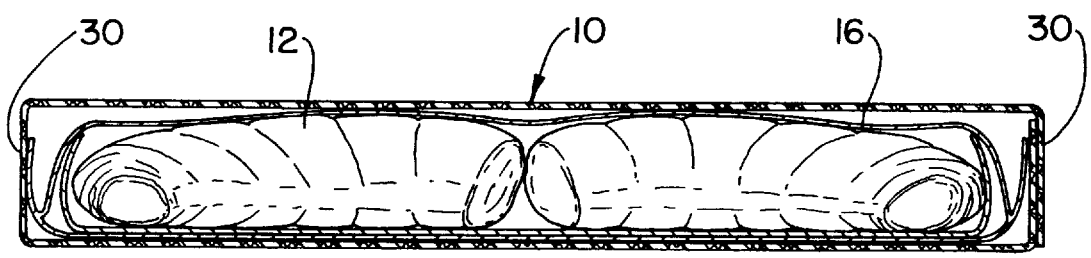
FIG. 3 is a cross sectional view taken along the lines 3—3 of FIG. 2.

With reference to FIG. 3, the packaged fish 13 of FIG. 2 are seen within package or bag 16, which in turn is within outer package 10. Sealed edges 30 of the bag 16 can be seen tucked so as to fit snugly within the outer package 10. The sides 21 of pallet 14 are shown serving as a buffer between the sides of bag 16 and the fish 13. It is contemplated that the outer package 10 will remain in place, which serves to protect the integrity of the bag or package 16 until time for microwaving, at which time it will be removed.

With reference to FIG. 4, the key steps of the process from packing to microwaving are presented. In Step 1, the shrimp 12 or fish 13 are coated in sauce or otherwise prepared and are placed on the pallet which may be substantially like pallet 14 of FIG. 1 except without sides 21. The shrimp 12 or fish 13 may be placed on pallet 14 by hand, machine (not shown), or by a combination of both.

The pallet 14 is then to be enveloped into bag 16 as shown in Step 2. If three sides of the bag are sealed already, as shown in Step 2 and in FIG. 1, the pallet 14 is pushed into the bag 16 as facilitated by the smooth surface 24 of the bottom of pallet 14. Either machine or a by-hand process may be used in placing the pallet 14 within the bag 16.

As shown in Alternative Step 2, the pallet 14 may be slid onto a bottom sheet of plastic film and another sheet placed on at top. Either sheets extending from rolls or discrete sheets can be used. The edges of top and bottom sheets will be joined together and heat sealed simultaneously with the vacuuming of the then-formed bag as represented in Step 3A.

As contemplated in Step 3, machinery well-known in packaging food stuffs can be used to create a vacuum within bag 16, sealing edge 18 in the process.

Alternatively, as shown in Step 3A and discussed above, the top and bottom sheets can be sealed on four sides, preferably by a standard heat sealing process as part of the vacuum process. The vacuum is applied before the four edges are sealed to create the vacuum packed shrimp or fish within package or bag 16. The shrimp or fish may have been coated in sauce or marinated to provide a tasty product when eventually consumed. As the vacuum is applied, the sauce is effectively sucked into the product to create a very flavorful, tasty seafood upon consumption.

In Step 4 the sealed bag or package 16 is placed within box or outer package 10 and the flaps 26, 28 as shown in FIG. 1, closed to complete the packing process. Step 4 can be conducted by hand or by machine, with the latter process being undertaken by packing machinery well known in the food stuffs industry.

At this juncture the packaged shrimp or fish is immediately subjected to flash freezing to preserve the quality and to prevent the formation of bacteria, mold, and yeast and botulism thus enabling the product to be shipped and sold in frozen form with greatly increased shelf life. Standard industry equipment is used to blast freeze, contact freeze or tunnel freeze the product.

It is contemplated that the shrimp 12 or fish 13 will remain frozen until approximate time of consumption, as shown as Step 5. This typically will be through distribution, retail storage and home or restaurant storage. As shown in Step 6, the package, bag or envelope 16 is to be removed from the outer package 10 and placed in its sealed condition, with contents frozen, in a microwave unit. The shrimp 12 or fish 13 will be effectively steamed as the package or bag 16 is designed to withstand the pressure of the steaming process with the bag 16 effectively becoming a steaming vessel. If the product has been marinated or coated in sauce, the sauce will be drawn into the product, increasing the taste thereof. In the absence of a sauce, the steaming causes the product to be microwaved efficiently and evenly. The shrimp 12 or fish 13 will then be ready for consumption once steamed. The length of time of microwaving depends on the characteristics of the microwave unit that is used. Generally, it is contemplated that time of microwaving will be approximately from two to ten minutes.

As shown in Step 7 of FIG. 4, only after the microwaving step is completed is the bag 16 cut open to remove the product for consumption. The bag 16 is not to be penetrated to cause any venting prior to the completion of the microwaving step.

In an alternative embodiment, shrimp 12 or fish 13 can be marketed in the package or bag 16 without being placed within the outer container 10. Sales indicia and literature may be place on the bottom of the pallet 14, or bag 16, or on a sales page inserted within the bag 16 or attached on the outside. In this embodiment with respect to microwaving in Step 6 (FIG. 4), there is no outer package 10 from which to remove the package or bag 16.

Viewing the overall steps from packing to microwaving, the shrimp or fish are coated in sauce or marinated and then vacuum packed in a negative pressure situation prior to flash freezing which does not effect the negative pressure within which the seafood is packed. Subsequently, upon microwaving, the expanding vapor turns the package or bag 16 effectively into a pressure vessel to steam the product.

It will be appreciated that fish or shrimp placed in a sauce as disclosed with respect to FIG. 1 or 2, will first have the sauce sucked into the seafood during the vacuum sealing and further forced into the seafood as steaming takes place during the step of microwaving. The bag 16 remains air-tight during microwaving and as the pressure increases from fluid vaporization, sauce is forced into the shrimp or fish products creating a flavorful product ready for consumption upon the completion of the microwaving step. If there is no sauce, the vaporizing nevertheless hastens the microwaving step.

With reference to FIG. 5, fish fillets 50 are shown which are inserted directly into the bag 52 without first being placed upon a pallet as was the case in the embodiment of FIG. 1. Fins, bones, etc. typically will have been removed so as to not cause a problem with the integrity of bag 52, i.e., by puncturing when in a packed condition. Once the fillets 50 have been inserted in the bag 52, the bag is vacuum sealed as was the case with the FIG. 1 embodiment. The bag 52 can then be inserted within outer package 54 or marketed without such outer packaging.

With reference to FIG. 6, a similar sequence to FIG. 5 is shown, only the fish fillets 50 have first been marinated or otherwise coated with sauce 60 before being inserted into bag 52. Upon vacuum sealing, which will cause the sauce to further penetrate the fish, the bag 52 may either be marketed as it is or placed in an outer package 54 as discussed with respect to FIGS. 1 and 5.

As discussed with respect to FIG. 1, the bag may also be formed around the seafood by lying the seafood on a bottom sheet, applying a top sheet and sealing the edges as is commercially known.

A variety of improvements and modifications to the packaging and process disclosed herein will be apparent. Accordingly, no limitation on the invention is intended by the foregoing description and drawings.

What is claimed is:

1. A process for packaging seafood, comprising the steps of:
   placing seafood and sauce for the seafood on a pallet, the seafood being placed in an ordered arrangement on the pallet;
   sliding said palletized seafood into a microwaveable bag to enclose the palletized seafood;
   applying a vacuum to the bag and the palletized seafood;
   sealing the bag and the enclosed palletized seafood under said vacuum; and then,
   flash freezing said sealed bag,
   wherein said pallet has a rough upper surface sufficient to restrain movement of said seafood and a smooth under surface sufficient to facilitate entry of said pallet into said bag, said seafood being placed on said rough upper surface and said ordered arrangement being such that the likelihood of the bag being penetrated or pierced by any parts of the seafood that is capable of doing so is diminished.

2. The method of claim 1, comprising the steps of adding the sauce to the seafood before placing the seafood on the pallet.

3. The method of claim 1, comprising the step of adding the sauce to the seafood after placing the seafood on the pallet.

4. The method of claim 1, comprising the step of flattening the seafood on the pallet.

5. The method of claim 1, wherein the seafood is shrimp.

6. The method of claim 1, wherein the seafood is lobster.

7. The method of claim 1, wherein the seafood is fish.

8. The method of claim 1, wherein the seafood is conch.

9. The method of claim 1, further comprising the step of placing the vacuum sealed palletized seafood in an outer carton having an opening for viewing the vacuum sealed seafood, said sealed bag being microwaveable and being adapted for removal from said outer carton prior to microwaving.

10. The method of claim 9, wherein said vacuum sealed palletized bag is adapted for microwave cooking the seafood in the sauce without unsealing the bag.

11. The method of claim 1, further comprising the step of microwave cooking the seafood in the sauce in the sealed bag.

12. A process for packaging seafood, comprising the steps of:
    placing seafood and sauce for the seafood on a pallet, the seafood being placed in an ordered arrangement on the pallet;
    placing the palletized seafood on a lower sheet of plastic film;
    placing an upper sheet of plastic film so that the extremities of the lower and upper sheets extend beyond the perimeter of the pallet and contact one another; and then,
    applying vacuum and sealing the upper and lower sheets to each other to seal the palletized seafood under vacuum between the sealed sheets;
    wherein said pallet has a rough upper surface sufficient to restrain movement of said seafood and a smooth under surface sufficient to facilitate sliding said pallet onto said lower sheet, said seafood being positioned in the flat orientation on said rough upper surface such that the likelihood of the sheets being penetrated or pierced by any part of the seafood that is capable of doing so is diminished.

13. The method of claim 12, comprising the steps of adding the sauce to the seafood before placing the seafood on the pallet.

14. The method of claim 12, comprising the step of adding the sauce to the seafood after placing the seafood on the pallet.

15. The method of claim 12, comprising the step of flattening the seafood on the pallet.

16. The method of claim 12, wherein the seafood is shrimp.

17. The method of claim 12, wherein the seafood is lobster.

18. The method of claim 12, wherein the seafood is fish.

19. The method of claim 12, wherein the seafood is conch.

20. The method of claim 12, further comprising the step of placing the vacuum sealed palletized seafood in an outer carton having an opening for viewing the vacuum sealed seafood, said vacuum sealed palletized seafood being microwaveable and being adapted for removal from said outer carton prior to microwaving.

21. The method of claim 20, wherein said vacuum sealed palletized bag is adapted for microwave cooking the seafood in the sauce without unsealing the bag.

22. The method of claim 12, further comprising the step of microwave cooking the seafood in the sauce in the sealed bag.

23. A vacuumized seafood package, comprising:

a pallet;

seafood and sauce for the seafood on the pallet, the seafood being positioned on said pallet in an ordered arrangement; and, a sealed bag enclosing said palletized seafood and sauce under vacuum; and, wherein said pallet has a rough upper surface sufficient to restrain movement of said seafood and a smooth under surface sufficient to facilitate engagement of said pallet and said bag, said seafood being positioned on said rough upper surface and said ordered arrangement being such that the likelihood of the bag being penetrated or pierced by any part of the seafood that is capable of doing so is diminished.

24. The package of claim 23, wherein said bag is formed from a plastic bag sealed except for an opening through which the palletized seafood and sauce is inserted.

25. The package of claim 23, wherein said bag is formed from upper and lower sheets of plastic film, the upper and lower sheets having extremities which extend beyond the perimeter of the pallet and are sealed to one another.

26. The package of claim 23, wherein the sauce is added to the seafood before the seafood is placed on the pallet.

27. The package of claim 23, wherein the sauce is added to the seafood after the seafood is placed on the pallet.

28. The package of claim 23, wherein the seafood is flattened on the pallet.

29. The package of claim 23, wherein the seafood is shrimp.

30. The package of claim 23, wherein the seafood is lobster.

31. The package of claim 23, wherein the seafood is fish.

32. The package of claim 23, wherein the seafood is conch.

33. The package of claim 23, further comprising an outer carton having an opening for viewing the vacuum sealed seafood, said sealed bag being microwaveable and being adapted for removal from said outer carton prior to microwaving.

34. The package of claim 33, wherein said vacuum sealed palletized bag is adapted for microwave cooking the seafood in the sauce without unsealing the bag.

35. The package of claim 23, wherein said vacuum sealed palletized bag is adapted for microwave cooking the seafood in the sauce without unsealing the bag.

* * * * *

UNITED STATES PATENT AND TRADEMARK OFFICE
CERTIFICATE OF CORRECTION

PATENT NO. : 5,863,578
DATED : January 26, 1999
INVENTOR(S) : GUARINO, Nicholas A.

It is certified that error appears in the above-identified patent and that said Letters Patent is hereby corrected as shown below:

Column 6, line 1, delete "at".

Signed and Sealed this

Fourteenth Day of December, 1999

Q. TODD DICKINSON

Attest:

Attesting Officer

Acting Commissioner of Patents and Trademarks